July 14, 1959
M. A. DUDASH
2,894,774
ADJUSTABLE LENGTH LINKAGE
Filed Sept. 25, 1957
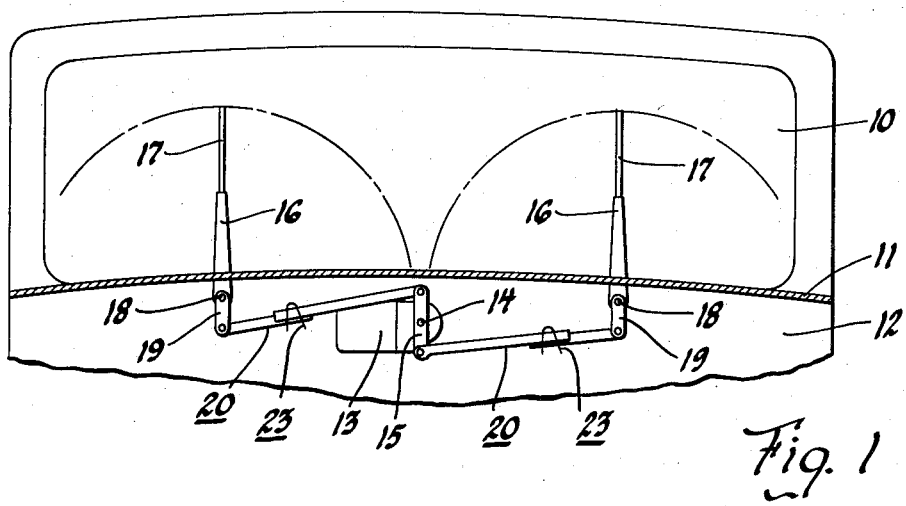
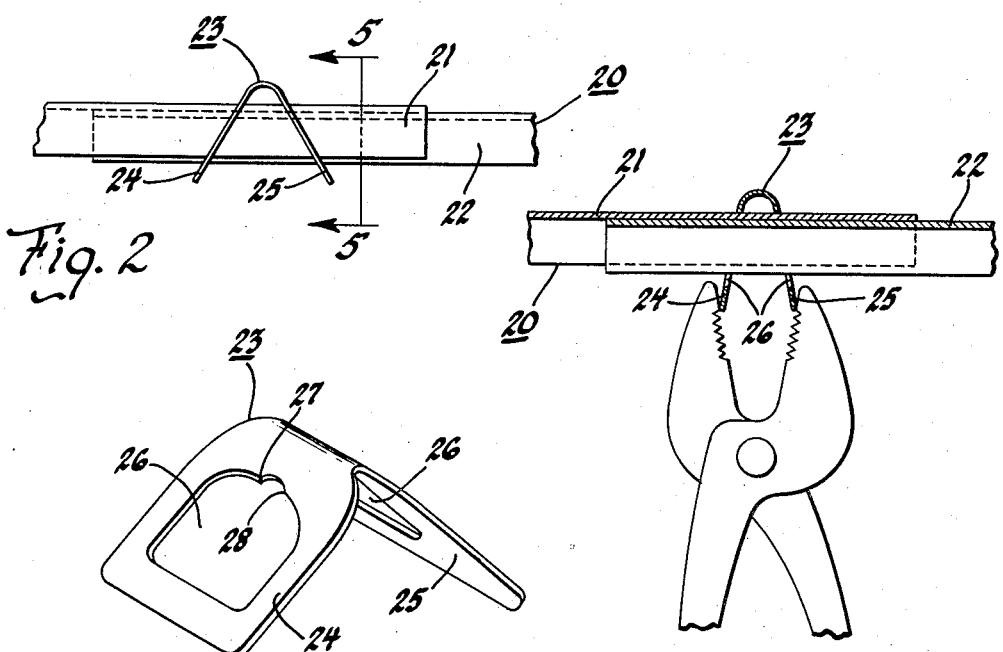
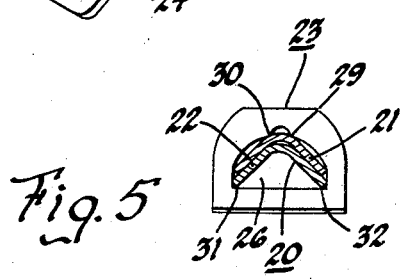
INVENTOR.
Michael A. Dudash
BY
G. H. Strickland
HIS ATTORNEY

United States Patent Office 2,894,774
Patented July 14, 1959

2,894,774
ADJUSTABLE LENGTH LINKAGE

Michael A. Dudash, Rochester, N.Y., assignor to General Motors Corporation, Detroit, Mich., a corporation of Delaware Application September 25, 1957, Serial No. 686,230

1 Claim. (Cl. 287—58)

This invention pertains to adjustable length linkages, and particularly to adjustable length links designed to transmit movement in windshield wiper drives.

The desirability of having adjustable length links, or connecting members, in windshield wiper drives is readily apparent, since due to manufacturing tolerances the distance between the pivot shafts of the same model vehicle varies. Moreover, different models of vehicles have different pivot locations, and hence it simplifies parts procurement if the connecting links are of adjustable length. The present invention relates to an improved adjustable linkage including a spring type locking device. Accordingly, among my objects are the provision of spring locking means for securely retaining a pair of superposed link members in any adjusted position; the further provision of a readily releasable spring lock of the aforesaid type; and the still further provision of a linkage assembly comprising a pair of nested V-shaped links and a straddling spring device for locking the links together.

The aforementioned and other objects are accomplished in the present invention by utilizing an apertured spring clip having sharp edges which dig into the superposed links. Specifically, in the illustrated embodiment, the links are of generally V-shape so that when superposed the ends of the links are in nested relation. The locking device comprises a generally V-shaped leaf spring having an elongated aperture in each leg. The length of the aperture in each diverging leg exceeds the combined thickness of the superposed link members. In addition, the aperture in each leg is defined by sharp edges, and is formed with a pair of sharp points adapted to dig into the upper link member.

During assembly of the link members, the link members are moved longitudinally relative to each other to obtain the desired over-all length. The superposed ends of the link members are inserted through the apertures of both legs of the locking device, the legs of which are pinched together so that the aperture in each leg permits relative movement between the links. Upon release of the ends of the spring clip, the legs snap to a position oblique to the longitudinal axes of the members and the sharp edges of the apertures dig into the superposed portions of the link members so as to securely retain them in position.

Further objects and advantages of the present invention will be apparent from the following description, reference being had to the accompanying drawing, wherein a preferred embodiment of the present invention is clearly shown.

In the drawings:

Figure 1 is a fragmentary view, partly in section and partly in elevation, of a vehicle equipped with the adjustable length linkage of this invention.

Figure 2 is a fragmentary view in elevation of the adjustable length linkage.

Figure 3 is a fragmentary sectional view indicating the manner in which the spring clip is released.

Figure 4 is a perspective view of the leaf spring clip.

Figure 5 is a sectional view taken along line 5—5 of Figure 2.

With particular reference to Figure 1, a portion of a vehicle including a windshield 10, a cowl 11 and a firewall 12 is shown. An electric motor 13 is mounted on the firewall 12, the motor having a rotary output shaft 14 to which a double ended crank 15 is connected. In accordance with conventional practice, the vehicle is equipped with a pair of spaced windshield cleaners, comprising arms 16 and blades 17 designed to move over asymmetrical paths across the outer surface of the windshield 10. The arms 16 are drivingly connected with spaced pivot shafts 18 having attached thereto crank arms 19. The crank arms 19 are movably connected to opposite ends of the double crank arms 15 by adjustable length linkages 20, which are constructed according to the present invention. The windshield cleaning mechanism aforedescribed operates in a conventional manner, since upon rotation of the shaft 14 and the crank 15 the wiper blades 17 will be moved simultaneously over asymmetrical paths.

With particular reference to Figures 2 through 5, the adjustable length linkages comprise a pair of V-shaped link members 21 and 22, which may be composed of metal. The V-shaped link members have superposed, or nested, end portions as seen in Figure 2. Moreover, the link members are slidable longitudinally relative to each other so as to vary the overall length of the linkage assembly. Prior to nesting the end portions of the links 21 and 22, a leaf spring clip 23, such as shown in Figure 4, is placed over the end of the link 21.

The leaf spring clip 23 is generally V-shaped, and thus includes a pair of diverging legs 24 and 25. Each leg has an aperture 26 therein, the aperture being defined by sharp edges. The size and shape of the aperture is determined by the size and shape of the links 21 and 22, and in the case of V-shaped links, the aperture 26 is formed with a pair of points 27 and 28 adjacent the bight of the spring clip. The length of the aperture 26 exceeds the combined thickness of the superposed link members 21 and 22 when the legs are normal to the longitudinal axes of the link members.

To assemble the spring clip 23 on the link 21, the end portions of the legs 24 and 25 are pinched together, by suitable means such as a pliers indicated in Figure 3. Thereafter, the link member 22 is nested with the link member 21 and moved longitudinally relative thereto to obtain the desired over-all linkage length. To securely retain the link members in adjusted position, the pinching force of the ends of the legs is removed thereby permitting the legs to expand to the position of Figure 2. The expanding movement of the legs causes the sharp edges of the apertures to bite into the links 21 and 22 at points 29, 30, 31 and 32 as indicated in Figure 5. To release the spring lock device, it is only necessary to pinch the legs together by means of pliers as indicated in Figure 3.

While the embodiment of the invention as herein disclosed constitutes a preferred form, it is to be understood that other forms might be adopted.

What is claimed is a follows:

A variable length linkage including, a pair of V-shaped metal members having superposed end portions, said members being longitudinally slidable relative to each other, and a member locking device comprising a generally V-shaped leaf spring having normally diverging legs, each leg having an elongated aperture therein of a length exceeding the combined thickness of the superposed end portions of the members, each aperture being defined by sharp edges and having a plurality of points adjacent the bight of the leaf spring, the superposed ends of said members being inserted through the apertures of both legs so that when the legs of the leaf spring are oblique to the longitudinal axes of said members the sharp edges dig into the edges of the inner V-shaped member and the points dig into the outer V-shaped member adjacent the apex thereof to lock said members in assembled relation.

References Cited in the file of this patent

UNITED STATES PATENTS

| | | |
|---|---|---|
| 2,438,101 | Wright | Mar. 16, 1948 |
| 2,476,427 | Melvin et al. | July 19, 1949 |
| 2,696,674 | Tilghman | Dec. 14, 1954 |
| 2,775,805 | Sands | Jan. 1, 1957 |

FOREIGN PATENTS

| | | |
|---|---|---|
| 109,796 | Australia | Feb. 12, 1940 |